United States Patent [19]

Swanson et al.

[11] 4,099,691

[45] Jul. 11, 1978

[54] BOUNDARY LAYER CONTROL SYSTEM FOR AIRCRAFT

[75] Inventors: Everts W. Swanson, Edmonds; Marvin D. Wehrman, Seattle, both of Wash.

[73] Assignee: The Boeing Company, Seattle, Wash.

[21] Appl. No.: 749,624

[22] Filed: Dec. 13, 1976

[51] Int. Cl.² .............................................. B64C 21/04
[52] U.S. Cl. .................................. 244/207; 244/214; 244/134 B
[58] Field of Search ................ 244/40 A, 42 CC, 207, 244/214, 199; 138/26, 28, 32, 106, 107; 248/DIG. 1, 70, 214, 65, 70, 291; 285/226, 61, 62, 63, 64; 403/28; 308/4 R, 237 A; 52/593

[56] References Cited

U.S. PATENT DOCUMENTS

| | | | |
|---|---|---|---|
| 1,578,344 | 3/1926 | Munroe | 52/593 |
| 1,586,562 | 6/1926 | Lucey | 308/4 R |
| 1,756,205 | 4/1930 | Merrick | 308/237 A |
| 2,277,173 | 3/1942 | Wagner et al. | 244/207 |
| 2,320,870 | 6/1943 | Johnson | 244/40 A |
| 2,873,931 | 2/1959 | Fleischmann | 244/207 |
| 2,896,881 | 7/1959 | Attinello | 244/207 |
| 3,047,208 | 7/1962 | Coanda | 244/208 |
| 3,062,483 | 11/1962 | Davidson | 244/207 |
| 3,142,457 | 7/1964 | Quenzler | 244/207 |
| 3,361,870 | 1/1968 | Whitehead | 138/107 |
| 3,467,043 | 9/1969 | Bowles | 244/207 |
| 3,634,609 | 1/1972 | Shimizu | 248/65 |
| 3,785,593 | 1/1974 | Chain et al. | 244/208 |
| 3,829,234 | 8/1974 | Benz | 248/DIG. 1 |
| 3,884,433 | 5/1975 | Alexander | 244/207 |
| 3,889,903 | 6/1975 | Hilby | 244/207 |
| 3,917,193 | 11/1975 | Runnels, Jr. | 244/42 CC |

FOREIGN PATENT DOCUMENTS

| | | | |
|---|---|---|---|
| 1,241,405 | 8/1960 | France | 244/208 |
| 885,449 | 12/1961 | United Kingdom | 244/207 |

OTHER PUBLICATIONS

Ernst et al., "YC-14 System for Leading Edge Boundary Layer Control," AAAA paper, No. 74-1278, 10-30-74.

Primary Examiner—Galen L. Barefoot
Attorney, Agent, or Firm—Christensen, O'Connor, Johnson & Kindness

[57] ABSTRACT

An improved boundary layer control system is particularly useful in applications where controlled air is to be injected into a boundary layer region adjacent to a surface of an aircraft wing. The controlled air is obtained from an air source having a temperature and a pressure which are substantially greater than ambient temperature and pressure, such as that obtained from a jet engine bleed air source. A number of manifolds are located in spanwise arrangement along the wing and serve to conduct the air from the source to a plurality of nozzle penums, each of which includes a plurality of spanwise-spaced apertures for injecting air into a portion of the boundary layer region. The manifolds are interconnected by compressible bellows and are mounted so that respective inboard ends are fixed and respective outboard ends are free to move longitudinally. At least one nozzle plenum is interconnected with and supported by each manifold through use of a pair of flexible, outboard feeder ducts and an intermediate, non-flexible feeder duct. The plurality of apertures are located in a front wall member of each nozzle plenum which is located in a spanwise slot in the leading edge of the wing and maintained substantially flush with the leading edge of the wing by upper and lower, spanwise tongues which are received in corresponding upper and lower spanwise grooves in the portions of the wing adjacent to the slot. Apparatus is also disclosed to limit the relative transverse movement of each nozzle plenum with respect to its associated manifold, to bleed controlled air from the plurality of manifolds when a substantial number of the apertures of the nozzle plenums are obstructed due to ice or the like, and to seal a separation between adjacent nozzle plenums to prevent substantial airflow between the exterior airstream and the wing interior.

1 Claim, 13 Drawing Figures

BOUNDARY LAYER CONTROL SYSTEM FOR AIRCRAFT

FIELD OF THE INVENTION

This invention generally relates to boundary layer control systems for aircraft and, more particularly, to an improved air delivery apparatus and injection structure forming part of such boundary layer control systems.

BACKGROUND OF THE INVENTION

Boundary layer control (BLC) systems are well known to the prior art for improving or maintaining the lift provided to a fluid foil by fluid flow over surfaces of the fluid foil. Without boundary layer control, separation of the boundary layer of fluid from the fluid foil surfaces often occurs under certain conditions, decreasing the lift that would otherwise be available. Accordingly, boundary layer control systems function to limit or prevent such boundary layer separation by injection of a controlled fluid into the boundary layer, such as by directing a controlled fluid stream along the foil surface in the direction of fluid flow.

BLC systems find particular applicability in conjunction with short takeoff and landing (STOL) aircraft. Such BLC systems for aircraft commonly include a plurality of air injectors, such as a plurality of slots or nozzles, distributed spanwise along each wing ahead of an airfoil surface for which boundary layer control is to be effected. For example, the air injectors may inject controlled air at a tangent to the airfoil surface, with the size of each injector, and the spanwise location and orientation of the injectors, being chosen to obtain a stream of air spanwise along the wing.

Such BLC systems for aircraft have also included an air delivery apparatus for providing controlled air to the plurality of injectors. Typically, the air delivery apparatus takes high pressure bleed air from the compressor stages of the aircraft's jet engines and supplies it, through appropriate valves and ducting, to the plurality of injectors. Such high pressure engine bleed air is desirable to minimize the surface area of the injectors so that cruise performance of the aircraft is not adversely affected. However, the utilization of such bleed air poses problems in the design, manufacture and operation of BLC systems. For example, the prior art demonstrates BLC systems for aircraft in which both the injectors and the air delivery apparatus are fabricted as an integral part of the wing structure. Since the engine bleed air has associated therewith a relatively high temperature with respect to the ambient, large thermal stresses between the boundary layer system components and the remaining elements of the wing structure are encountered which have not been satisfactorily minimized by previous designs. Prior art BLC systems for aircraft also provide structure in which either or both of the injectors and air delivery apparatus are located external to the wing structure. While minimizing thermal stresses, such systems are disadvantageous with respect to those in which the boundary layer control system is an integral part of the wing inasmuch as the external structure introduces aerodynamic drag and therefore loses many of the benefits desired for boundary layer control.

Finally, the solutions afforded to the aforementioned thermal stress and aerodynamic problems which are incorporated in the BLC systems of the prior art typically result in apparatus which is expensive to manufacture and install.

It is therefore an object of this invention to provide an improved boundary layer control system for aircraft.

It is another object of this invention to provide such an improved boundary layer control system for aircraft in which the injectors and air delivery apparatus components thereof are integral with the wing structure to provide superior boundary layer control but which are designed to accommodate flexure of the wing structure and thermal expansion of the air delivery apparatus due to the use of high temperature, high pressure engine bleed air.

It is yet another object of this invention to provide such an improved boundary layer control system for aircraft which is inexpensive to manufacture and low in materials cost as compared with prior art boundary layer control systems.

SUMMARY OF THE INVENTION

Many of these objects, and other objects and advantages which will be recognized by those skilled in the art, are achieved, briefly, by an improved boundary layer control system for aircraft for injecting controlled air, which is obtained from a controllable air source and whose temperature and pressure are substantially greater than ambient temperature and pressure, into a boundary layer region adjacent to an airfoil surface of the aircraft from a plurality of points located spanwise along at least a portion of a surface of a member of the aircraft forward of the airfoil surface.

The system includes means defining a slot in the forward surface, with the slot extending spanwise along the forward surface substantially coextensive with the portion of the forward surface from which controlled air is to be injected.

A plurality of longitudinally-extending manifolds for conducting air from the controllable source thereof to points along the forward surface are also provided, with each manifold having an open inboard end and an open outboard end. The plurality of manifolds are mounted within the member in successive spanwise arrangement by a plurality of first supports and a plurality of second supports. Each of the first supports secures, in a fixed position, one of the plurality of manifolds to the member in proximity to a respective inboard end of the manifold. Each of the second supports secures one of the plurality of manifolds to the member in proximity to a respective outboard end of the manifold so that each manifold can expand longitudinally and thus in a spanwise direction along the member. First means is provided for interconnecting the inboard end of the most inboard one of the plurality of manifolds with the controllable air source. A plurality of second means are provided for interconnecting the inboard end of each successive outboard one of the plurality of manifolds with the outboard end of an adjacent inboard one of the plurality of manifolds, with each second means being capable of compression upon longitudinal expansion of said manifolds.

A plurality of longitudinally-extending nozzle plenums are also provided, at least one nozzle plenum being associated with a corresponding one of the plurality of manifolds, with each nozzle plenum having a closed inboard end and a closed outboard end, and further having a front wall member configured to fit into the slot and having located therealong a plurality of apertures arranged to inject air into the boundary layer region. Each nozzle plenum also has an upper tongue and a lower tongue both extending longitudinally therealong from the inboard end to the outboard end.

A plurality of third means interconnect each nozzle plenum with and support each nozzle plenum from the corresponding one of the plurality of manifolds so that the plurality of nozzle plenums are located within the member and in successive spanwise arrangement therealong. Each said third means includes first and second feeder ducts respectively located in proximity to the inboard and outboard ends of each nozzle plenum, the first and second feeder ducts being capable of permitting relative longitudinal movement between the nozzle plenum and the corresponding one of the plurality of manifolds. Each third means further includes a third feeder duct located intermediate the first and second feeder ducts.

Finally, means are provided within the member which define upper and lower, longitudinal grooves respectively extending above and below and both adjacent to the slot and receiving the upper and lower tongues of the plurality of nozzle plenums for permitting the nozzle plenums to move longitudinally relative to the member and for maintaining the front wall member of each nozzle plenum substantially flush with the forward surface.

BRIEF DESCRIPTION OF THE DRAWINGS

The invention can perhaps best be understood by reference to the following portions of the specification, taken in conjunction with the accompanying drawings in which.

FI. 5 is a partial cross-sectional view of a sliding support used for the outboard mounting of the manifold and nozzle plenum structure to the wing structure.

DESCRIPTION OF A PREFERRED EMBODIMENT

Figure 1:
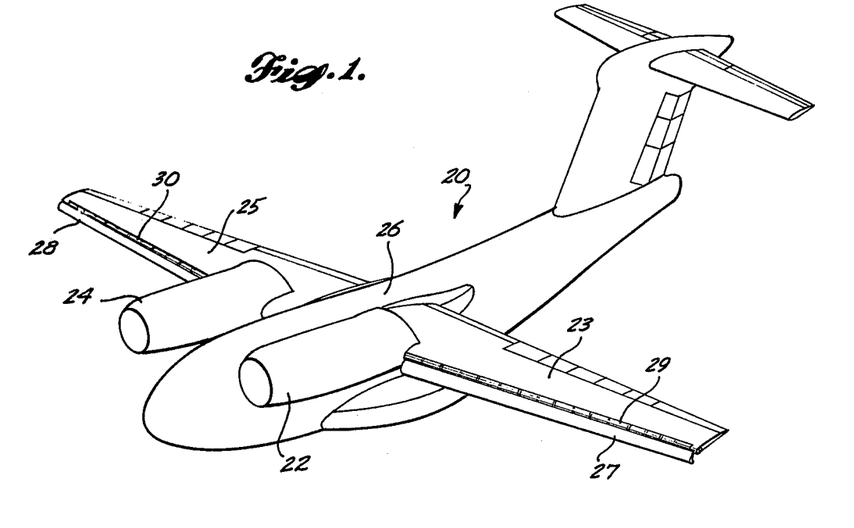
FIG. 1 is a pictorial diagram illustrating a short take off and landing (STOL) aircraft incorporating the improved boundary layer control system of the present invention.

With reference to FIG. 1, a STOL aircraft 20 is illustrated which includes first and second jet engines 22, 24 which are located on and project to the front of respective left and right wings 23, 25 extending from a fuselage 26, with the engines 22, 24 being closely adjacent to the fuselage 26. Located outboard of the engines 22, 24 on and supported by respective left and right wings 23, 25 are a plurality of variable-camber leading edge, or Krueger, flaps 27, 28. Such leading edge flaps 27, 28 are well known to the prior art and are, in this instance, constructed in eight adjacent sections, each of which is normally stored in a cavity located in the underside of the respective wing 23 or 25 and which can be rotated from that storage position upon command of the pilot or an automated control system to an extended position in front of the leading edge of the respective wing, as illustrated in FIG. 1. As is also well known to the art, leading edge flaps such as flaps 27, 28 provide increased lift at low air speeds when deployed by effectively moving points of air stagnation forwrd from the leading edges of the wings 23, 25. Situated in the leading edges of the wings 23, 25 are a plurality of BLC injectors 29, 30, each of which extends spanwise along the respective wing 23 or 25 from the associated jet engine 22 or 24 to the corresponding wing tip and each of which is configured to direct a stream of BLC air in a rearward direction along an upper wing surface of the corresponding wing 23 or 25.

Figure 2:
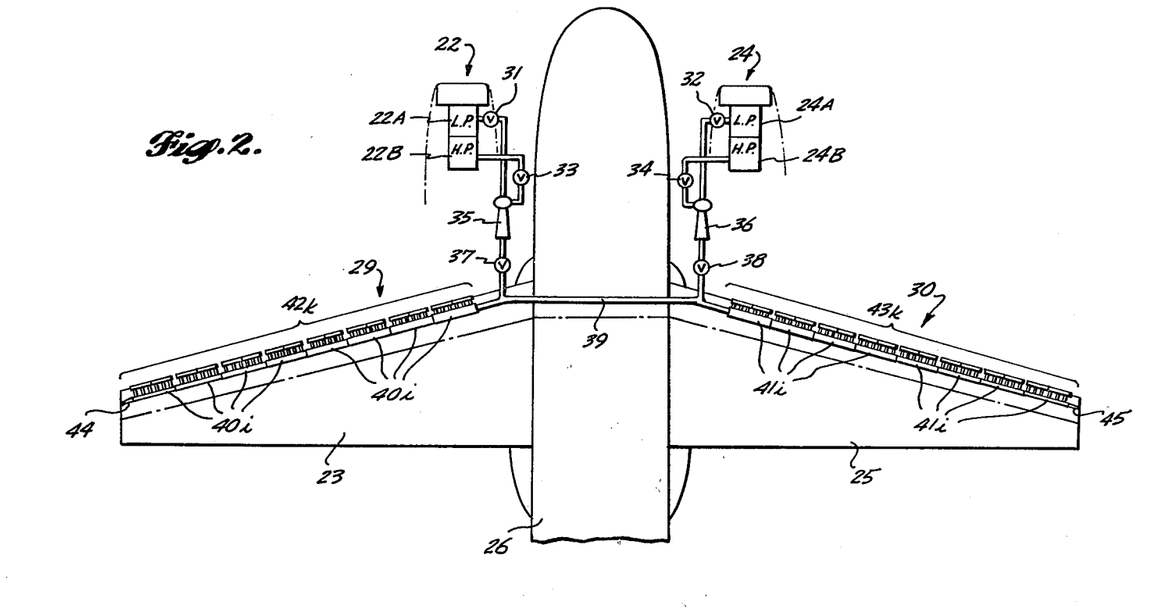
FIG. 2 is a schematic diagram of the improved boundary layer control system.

FIG. 2 illustrates in schematic form the improved BLC system, with particular emphasis upon an air delivery apparatus for providing BLC air from the jet engines 22, 24 to the respective injectors 29, 30. In FIG. 2, the jet engine 22 has a low pressure compressor stage 22A and a high pressure compressor stage 22B, both of which have accessible bleed air connections. Similarly, the jet engine 24 has a low pressure compressor stage 24A and a high pressure compressor stage 24B. As an example, the jet engines 22, 24 may comprise General Electric type CF6-50D. For such engines, the stages 22A, 24A may comprise the 8th compressor stages, while the stages 22B, 24B may comprise the 14th compressor stages. For such engines, the bleed air available is at a relatively high pressure and temperature with respect to ambient pressure and temperature.

Stages 22A, 24A are connected by respective check valves 31, 32 and associated conduits to first inputs of mixing ejectors 35, 36, and the stages 22B, 24B are connected via respective shut-off valves 33, 34 and associated conduits to second inputs of mixing ejectors 35, 36. Outputs of mixing ejectors 35, 36 are connected via respective shut-off valves 37, 38 and associated conduits to a common supply duct 39 for the BLC system.

Appropriate control circuitry, not illustrated and not forming part of the present invention, is utilized to control the shut-off valves 33, 34 and 37, 38 to supply BLC air to the common supply duct 39 during landing and take-off maneuvers of the STOL aircraft 20. As can be appreciated, BLC air can be supplied from either or both of the engines 22, 24 through corresponding control of the shut-off valves 37, 38. In typical approach and go-around maneuvers, shut-off valves 33, 34 and 37, 38 will be open, thereby supplying BLC air from each of the stages 22A and 24A, and 22B and 24B, with ejectors 35 and 36 functioning to mix the air streams from their respective compressor stages. In a typical take-off maneuver and in a landing maneuver wherein thrust reversers are utilized, valves 33 and 34 will be closed, thereby causing BLC air to be supplied only from the compressor stages 22A and 24A. Where one of the engines 22 and 24 is inoperative, for example, engine 24, shut-off valve 38 is closed and shut-off valve 33 is opened to supply BLC air from both stages 22A and 22B of the operating engine 22 during all maneuvers. During the times when shut-off valves 33 and 34 are open, check valves 31 and 32 function to prevent bleed-back of high pressure air into the low pressure compressor stages 22A and 24A.

Tests conducted with an arrangement similar to that illustrated in FIG. 2 and utilizing General Electric type CF6-50D engines have indicated that the pressure and temperature of the BLC air delivered to the common supply duct 39 ranges from approximately 80 psi at approximately 675° F. to approximately 120 psi at approximately 900° F. during the maneuvers described.

The common supply duct 39 is connected, on the one hand, to a firstone of a plurality of serially-connected manifolds $40_i$ located in the left wing 23 and, on the other hand, to a first one of a plurality of serially-connected manifolds $41_i$ located in the right wing 25. A plurality of nozzle plenums $42_k$ are interconnected with the plurality of manifolds $40_i$, and a plurality of nozzle plenums $43_k$ are interconnected with the plurality of manifolds $41_i$. A portion of each of the nozzle plenums $42_k$, $43_k$ is physically located in the leading edges of the wings 23 and 25 and incorporates therein the plurality of injectors 29 and 30.

In a working prototype of the invention, eight manifolds $40_i$, $41_i$, were utilized, that is, $i = 1 \rightarrow 8$, and two nozzle plenums $42_k$, $43_k$, were associated with each manifold $40_i$, $41_i$, that is, $k = 1 \rightarrow 16$.

The most outboard ones of the manifolds $40_i$, $41_i$ terminate in respective venturis 44, 45 in the respective tips of the wings 23, 25 to provide bleed outlets for the BLC air for de-icing purposes as hereinafter described.

The following portion of the description will center only upon that portion of the BLC system associated with wing 23, inasmuch as it is to be clearly understood that the portion of the BLC system associated with wing 25 is similarly and symmetrically constructed.

Figure 3:
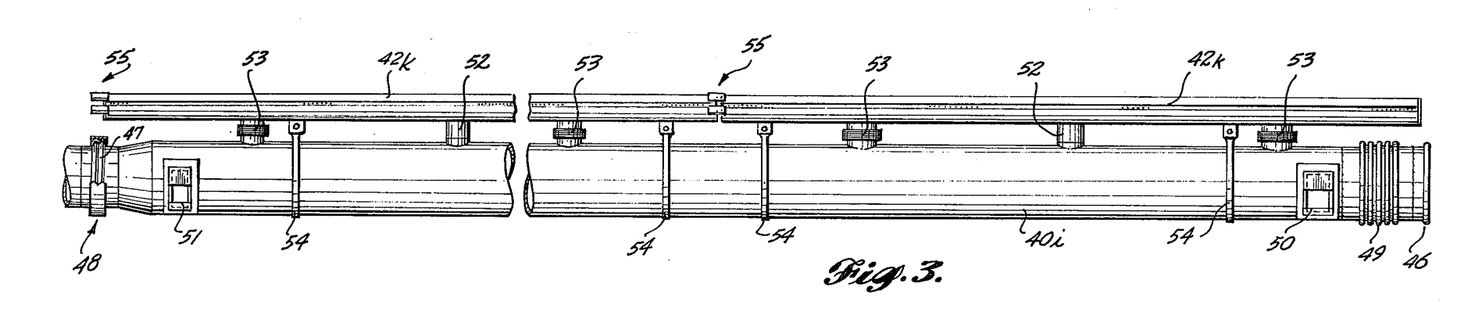
FIG. 3 is a top plan view of a manifold and nozzle plenum structure forming part of the boundary layer control system.

A typical manifold $40_i$ and two associated nozzle plenums $42_k$ are illustrated in FIG. 3, with it being understood that the specific physical dimensions of the manifolds $40_i$ and nozzle plenums $42_k$ are varied as one proceeds spanwise along the wing 23 to achieve, in conjunction with the size and spacing of the injectors 29, a constant momentum blowing coefficient of the BLC air across the upper surface of wing 23.

In FIG. 3, (reference also corresponding portions of FIGS. 4, 7, 8, and 9), the manifold $40_i$ is seen to comprise an elongated tubular duct, of metallic material, having a first or inboard end (to the right of FIG. 3) and a second or outboard end (to the left of FIG. 3). Circumferential lips 46, 47 are provided at the first and second ends of manifold $40_i$, with lip 46 being welded or otherwise secured to a bellows 49 which in turn is welded or otherwise secured to the first end of manifold $40_i$, and with lip 47 being welded or otherwise secured to the second end of manifold $40_i$. Both lips 46 and 47 are designed to abut corresponding lips on the adjacent manifolds $40_i$ so that the adjacent manifolds $40_i$ may be secured to each other by appropriate Marmon clamps 48, or equivalent clamps, which are fitted around lips 46 and 47. The bellows 49 can be any type that permits expansion and contraction in a direction parallel to the longitudinal axis of manifold $40_i$. Such a bellows is available from Metal Bellows Company, division of Zurn Industries, Inc., and identified as "Series 1000". A pair of inboard lugs 50 are welded or otherwise secured to the manifold $40_i$ at a location adjacent the first end, and a pair of outboard lugs 51 are welded or otherwise secured to the manifold $40_i$ at a location adjacent the second end thereof. As will be described, the lugs 50, 51 function to allow support of the manifold $40_i$ from corresponding elements of the wing structure.

BLC air supply from the manifold $40_i$ to each nozzle plenum $42_k$ is afforded by a pair of feeder ducts 53 located toward respective first and second ends of the nozzle plenum $42_k$ and a feeder duct 52 intermediate to feeder ducts 53. Feeder duct 52 is generally tubular in construction, is formed from metallic material, and is secured to both the nozzle plenum $42_k$ and the manifold $40_i$ by welding or otherwise, with corresponding apertures being provided in nozzle plenum $42_k$ and manifold $40_i$ to permit air passage through duct 52. Feeder ducts 53, on the other hand, incorporate therein a metallic bellows that permits expansion and contraction thereof in a direction transverse to the longitudinal axis thereof, with each feeder duct 53 being appropriately secured, by welding or otherwise, to both manifold $40_i$ and the nozzle plenum $42_k$. It will be appreciated that each nozzle plenum $42_k$ therefore can have a shearwise movement with respect to manifold $40_i$ at points spaced away from the relatively fixed support therebetween afforded by the intermediate feeder duct 52. A suitable bellows for use in feeder ducts 53 is that available from Metal Bellows Company as its part number 69307.

Although the nozzle plenum $42_k$ is rigidly secured to the manifold $40_i$ through the connections afforded by feeder ducts 52 and 53, a certain amount of movement of the nozzle plenum $42_k$ with respect to the manifold $40_i$ is possible in a direction transverse to the longitudinal dimensions thereof. Accordingly, a pair of tie straps 54 are provided which are secured at both ends to corresponding lugs 54A (FIG. 4) welded or otherwise secured to the nozzle plenum $42_k$ and which pass around adjacent portions of the manifold $40_i$.

Figure 11:
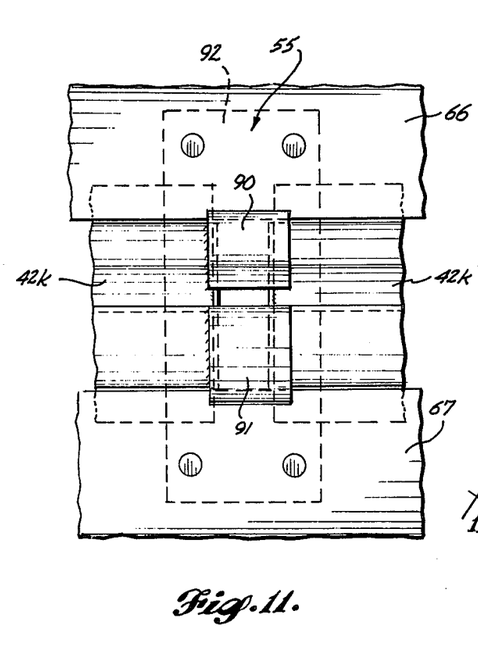
FIG. 11 is a front elevation view illustrating the installation of sealing plates for adjacent nozzle plenums when installed in the wing.
Figure 12:
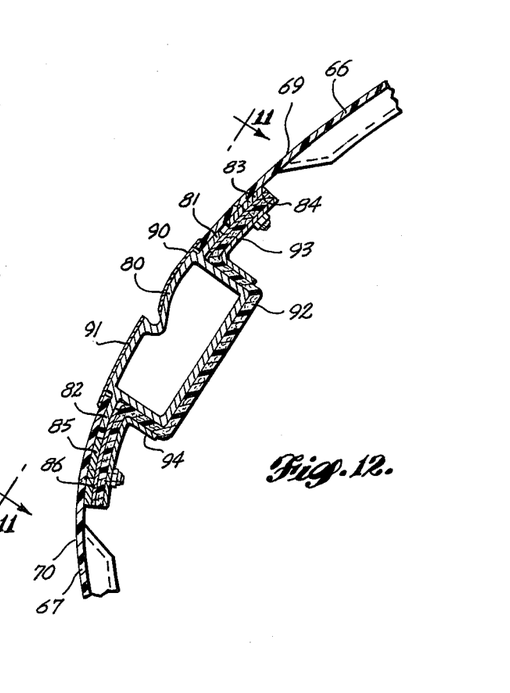
FIG. 12 is a cross-sectional view of the sealing plate structure of FIG. 11.

As can be seen in FIG. 3, the respective ends of adjacent nozzle plenums $42_k$ are separated by a small distance to allow longitudinal expansion thereof. A sealing plate structure 55, more completely described in conjunction with FIGS. 11 and 12, is provided in conjunction with the ends of adjacent nozzle plenums $42_k$ to provide a sliding cover over the separated ends of adjacent nozzle plenums $42_k$.

With particular reference now to FIGS. 4–9, it will be seen that the wing 23 includes a nose beam 60 which extends spanwise along the wing (and to which are attached a plurality of support ribs for the wing structure aft of the leading edge) and an adjoining, lower support beam 61 also having a spanwise extension. A plurality of upper air support ribs 62 and a corresponding plurality of lower air support ribs 63 are affixed, respectively, to the nose beam 60 and support beam 61 and separated from each other at spanwise locations therealong. An upper surface of each of the plurality of upper air support ribs 62 is arcuate and fastened thereto is an arcuate upper nose panel 66. Similarly, a lower surface of each of the lower air support ribs 63 is arcuate and attached thereto is an arcuate lower nose panel 67. In assembly, corresponding ones of the plurality of ribs 62 and the plurality of ribs 63 are aligned and are tied together by tie straps 68.

The nose panels 66 and 67 preferably are formed from a fiberglass material, because of the high temperatures encountered therein due to the proximity of the nose panels 66 and 67 to the BLC air delivery apparatus. In a working prototype of the invention, this material comprised inner and outer sheets of fiberglass reinforced epoxy resin laminated to a honeycomb core of "Nomex" material, with recesses therein being provided to receive the corresponding plurality of air support ribs 62 and 63. In assembly, it will be noted that the nose beam 60, the support beam 61, and the upper nose panels 66 and 67 form a chamber extending spanwise in the leading edge of the wing in which the manifolds $40_i$ and associated nozzle plenums $42_k$ are situated. Further, it will be noted that a spanwise or longitudinal slot is created between the upper and lower nose panels 66, 67 through which a surface of the nozzle plenums $42_k$ is exposed.

Figure 4:
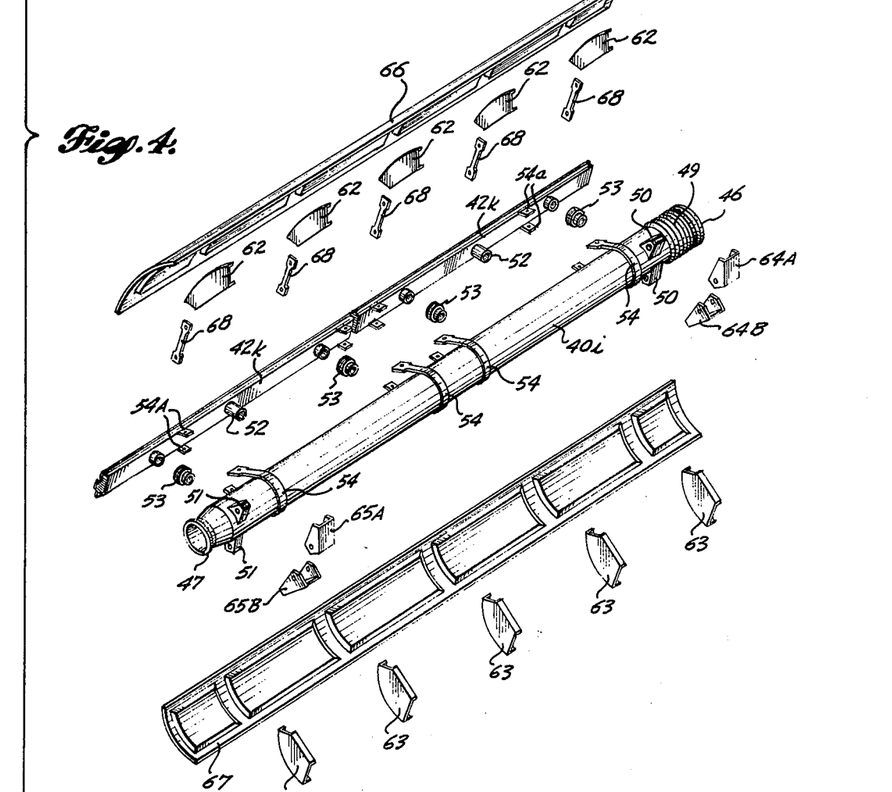
FIG. 4 is an exploded pictorial diagram illustrating the manifold and nozzle plenum structure and associated wing structure components.

Inboard upper and lower support channels 64A, 64B and outboard upper and lower support channels 65A, 65B are provided to support each manifold $40_i$ from the wing structure. Support channels 64A, 64B are secured, respectively, to the nose beam 60 and support beam 61 and receive a corresponding pair of the inboard lugs 50 with a non-sliding fit. Support channels 65A and 65B are secured, respectively, to the nose beam 60 and the support beam 61 and receive a corresponding pair of the outboard lugs 51 with a sliding fit.

Figure 5:
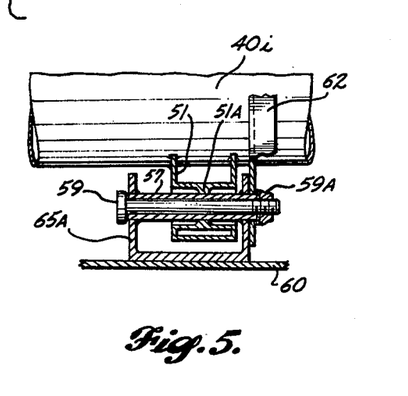

With reference now to FIG. 5, the support channel 65A has extending therethrough, in a direction parallel to the longitudinal dimension of the nose beam 60, an aperture in which is received an elongated cylindrical bushing 57. To secure the manifold $40_i$ to the support channel 65A, the bushing 57 is passed through a corresponding aperture in the outboard lug 51 which has a centrally-located, necked-down bearing surface 51A riding on and in contact with the outer surface of the bushing 57. The sliding joint is secured by a bolt 59 whose shank passes through the bushing 57 and whose head bears on a first leg of the support channel 65A. The shank of bolt 59 protrudes past a second, opposite leg of the support channel 65A and has threaded thereon a nut 59A. At rest with no BLC air being supplied to the manifold $40_i$, the lug 51 remains in the position illustrated in FIG. 5. When BLC air is supplied, thermal expansion of the manifold $40_i$ in a longitudinal dimension causes the lug 51 to slide to the left over the bushing 57. In addition, the relatively small area of frictional contact between the lug 51 and bushing 57 afforded by the bearing surface 51A allows such movement even where manifold $40_i$, and lug 51 are misaligned, as would be the case upon flexure of the wing 23.

Figure 6:
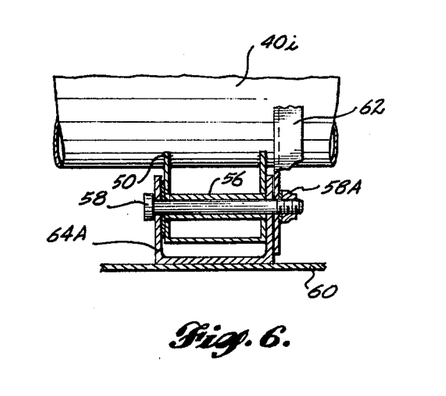
FIG. 6 is a partial cross-sectional view of a fixed support used for the inboard mounting of the manifold and nozzle plenum structure to the wing structure.

In FIG. 6, the inboard lug 50 is provided with an aperture extending therethrough in which is received an elongated, cylindrical bushing 56. The support channels 64A is likewise provided with an aperture extending therethrough and in a direction parallel to the longitudinal extension of nose beam 60. A bolt 58 has its shank extending through the apertures in support channel 64A and throgh the bushing 56 to complete the fixed support, with the head of bolt 58 bearing on a first leg of the support channel 64A and with a nut 58A being threaded on a second end of the bolt 58 and bearing against a second leg of the support channel 64A.

The sliding and fixed supports provided by lugs 51, 50 and support channels 65B, 64B are similar to those provided by lugs 51, 50 and support channels 65A, 64A.

Figure 7:
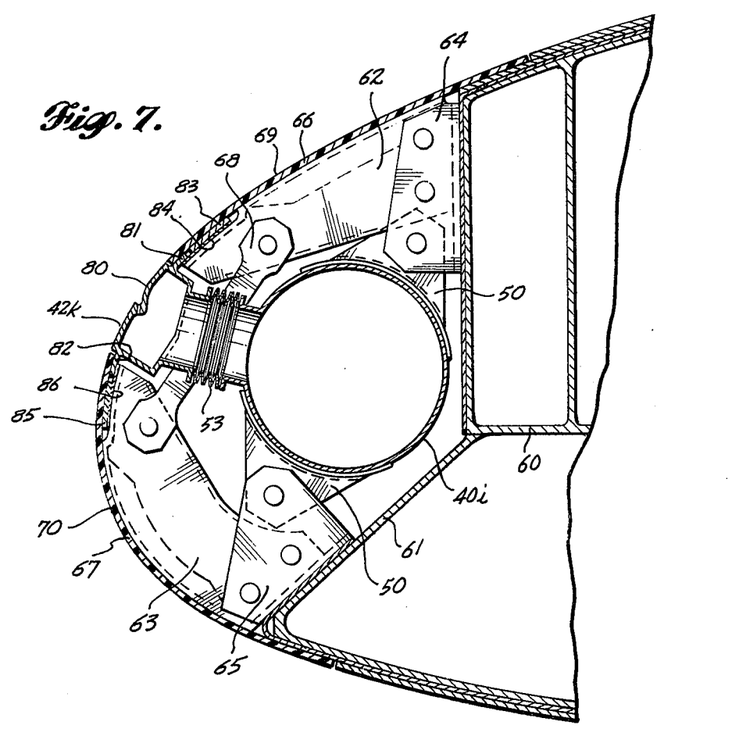
FIG. 7 is a first cross-sectional view illustrating the manifold and nozzle plenum structure as installed in the wing.

Each nozzle plenum $42_k$ (FIGS. 4, 7, 8 and 9) is substantially rectangular in cross-section, with the first and second ends of each nozzle plenum $42_k$ being closed so that air inlet thereto is only through the feeder ducts 52, 53 and air outlet therefrom is only from the plurality of injectors 29 therein to be hereinafter described. The nozzle plenum $42_k$ has a front wall member 80 which is semi-arcuate in configuration and which has a vertical dimension substantially equal to the separation between the upper and lower nose panels 66, 67 defining the slot therebetween. As best illustrated in FIGS. 7, 8, and 9, the front wall member 80 is maintained substantially flush with respective outer surfaces 69, 70 of the upper and lower nose panels 66, 67 by the support structures for the nozzle plenum $42_k$ including the feeder ducts 52, 53 and the tie straps 54.

To provide a means for allowing each nozzle plenum $42_k$ to expand or contract spanwise with respect to the adjacent nose panel 66, 67 and to further provide a means for restricting airflow between the exterior of the leading edge of the wing 23 and the chamber containing the BLC air delivery apparatus, each nozzle plenum $42_k$ is provided with an upper tongue 81 and a lower tongue 82 which extend longitudinally along each respective upper and lower surface of the nozzle plenum $42_k$. A first spanwise groove is provided for receiving the upper tongue 81, this groove being defined by a longitudinal or spanwise spacer 83 and a longitudinal or spanwise plate 84, both of which are secured by appropriate fasteners to the upper nose panel 66 at locations adjacent to the slot for the nozzle plenum 42A. Likewise, a second spanwise groove is provided for receiving the lower tongue 82, this groove being formed by a longitudinal or spanwise spacer 85 and a longitudinal or spanwise plate 86, both of which are secured by appropriate fasteners to the lower nose panel 67 at locations adjacent the slot for the nozzle plenum $42_k$.

Figure 10:
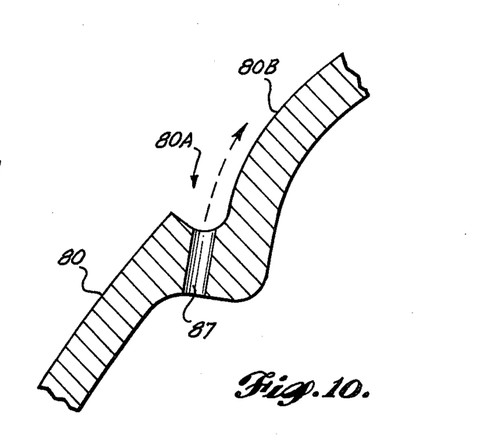
FIG. 10 is a cross-sectional view of a portion of the nozzle plenum and illustrating a typical injector or nozzle therein.

Included in the front wall member 80 of the nozzle plenum $42_k$ are the plurality of injectors 29, each of which is seen in FIG. 10 to comprise a notch 80A in the front or exterior surface of the front wall member 80, with a hole 87 being drilled therethrough and exiting in the notch 80A so that BLC air is directed substantially tangentially to a portion of exterior surface 80B above the notch 80A. Proper choice of the number, spanwise distribution, and size of the apertures 87 results in BLC air being discharged therefrom to flow over the upper portion of exterior 80B and therefore over the adjacent exterior surface 69 of upper nose panel 66 to effect boundary layer control.

Figure 8:
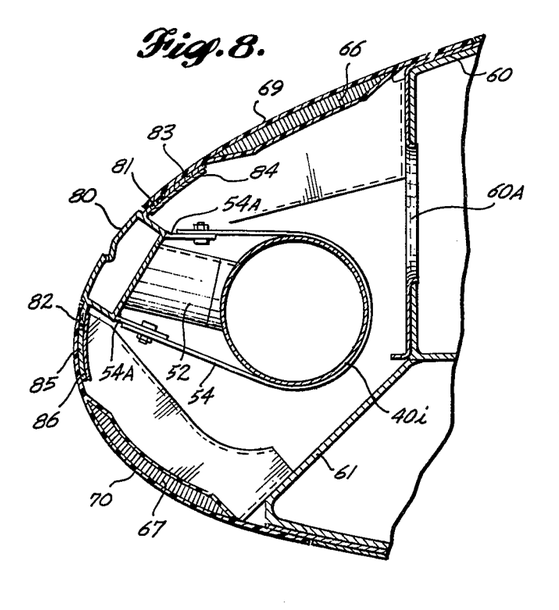
FIG. 8 is a second cross-sectional view illustrating the manifold and nozzle plenum structure as installed on the wing.
Figure 9:
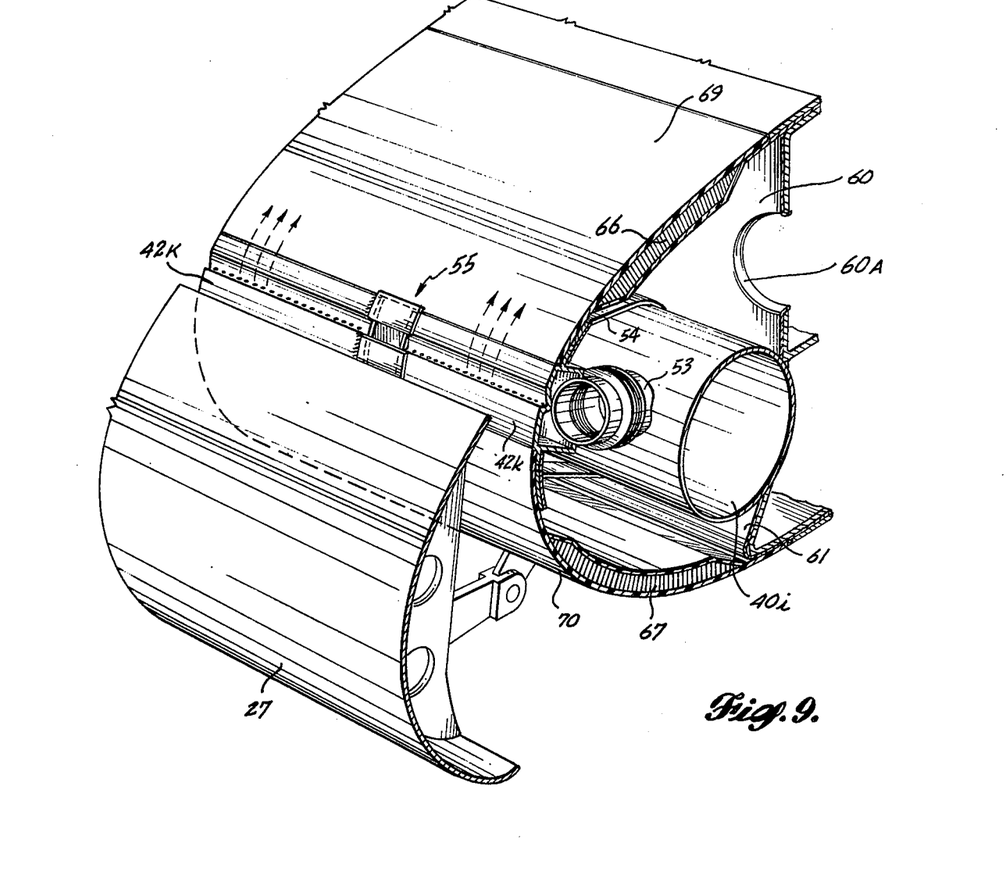
FIG. 9 is a front pictorial view of the wing structure with a portion being cutaway to illustrate the arrangement of the manifold and nozzle plenum structure therein.

As best illustrated in FIGS. 8 and 9, a plurality of holes 60A are provided in the nose beam 60 and located spanwise therealong to vent the chamber including the BLC air delivery apparatus to the ambient to avoid over pressurization of this chamber under the condition where a leak occurs in the air delivery apparatus and to additionally provide access to that air delivery apparatus for manufacturing, repair and inspection.

Before BLC air is introduced into the air delivery apparatus, the structure thereof is at ambient temperature and thus is unexpanded as illustrated in the drawings. Upon the introduction of BLC air, each manifold $40_i$ undergoes a longitudinal expansion. Since the inboard end of each manifold $40_i$ is fixed to the wing structure by the fixed support afforded by the pair of lugs 50 and support channels 64A, 64B, it will be seen that expansion occurs at points outboard of the fixed support, with the outboard end of the manifold $40_i$ moving longitudinally in an outboard direction with respect to the wing structure in proximity thereto and with the longitudinal expansion being taken up by compression of the bellows 49 on the adjacent outboard manifold $40_i$. In a working prototype of the invention, each manifold $40_i$ was approximately 6 inches in length and was found to longitudinally expand approximately one-half inch from ambient temperature to 900° F.

During this expansion, the nozzle plenums $42_k$ associated with each manifold $40_i$ also will be moved longitudinally due to the fixed connections afforded by the intermediate feeder ducts 52. As a result, the tongues 81, 82 thereon slide in the grooves in the nose panels 66, 67 respectively afforded by the spacer 83 and plate 84 and by the spacer 85 and plate 86. Upon such movement, the gap normally existing between the ends of the nozzle plenums $42_k$ associated with a manifold $40_i$ and the nozzle plenums $42_k$ associated with adjacent inboard and outboard ones of the manifolds $40_i$ is substantially closed (or, is reduced by an amount substantially equal to the longitudinal expansion of each manifold $40_i$). Each nozzle plenum $42_k$ has very little longitudinal expansion with respect to its associated manifold $40_i$, and that expansion is accommodated by the bellows within feeder ducts 53.

The sealing plate structure 55 is best illustrated in FIGS. 11 and 12 and includes an upper plate 90 and a lower plate 91, one end of each of which is welded or otherwise secured to respective portions of the exterior surface 80B of the front wall member 80 above and below the notch 80A therein and at the outboard end of each nozzle plenum $42_k$. Second or outboard ends of plates 90 and 91 respectively overlie adjacent inboards ends of the adjacent nozzle plenum $42_k$. In manufacturing, plates 90 and 91 are rotopeened so that the ends thereof are substantially flush with the adjacent surfaces of nose panels 66 and 67. Within the wing chamber, a flexible plenum seal 92 is fitted over the outboard and inboard ends of adjacent nozzle plenums $42_k$. An upper, L-shaped metallic seal retainer 93 and a lower L-shaped metallic seal retainer 94 likewise extend across adjacent nozzle plenums $42_k$ with the upper seal retainer 93 and the upper end of plenum seal 92 being secured to the upper nose panel 66 with the same fasteners that are used to secure spacers 84 and plate 84 thereto, and with the lower seal retainer 93 and the lower end of plenum seal 92 being secured to the lower nose panel 67 by the same fasteners that are used to secure spacer 85 and plate 86 thereto. In this manner, substantial airflow through the gap between the adjacent nozzle plenums $42_k$ is limited to that between the plates 90 and 91, and even that is blocked by the underlying plenum seal 92.

During expansion of the air delivery apparatus, the gap between adjacent nozzle plenums $42_k$ in FIG. 11 is substantially closed, with the plates 90 and 91 sliding to the right and with the gap between plates 90 and 91 being provided to allow BLC air to continue to flow from those ones of the plurality of injectors 29 located in the outboard one of the nozzle plenums $42_k$ (that to the right in FIG. 11) in proximity to the plates 90, 91.

Figure 13:
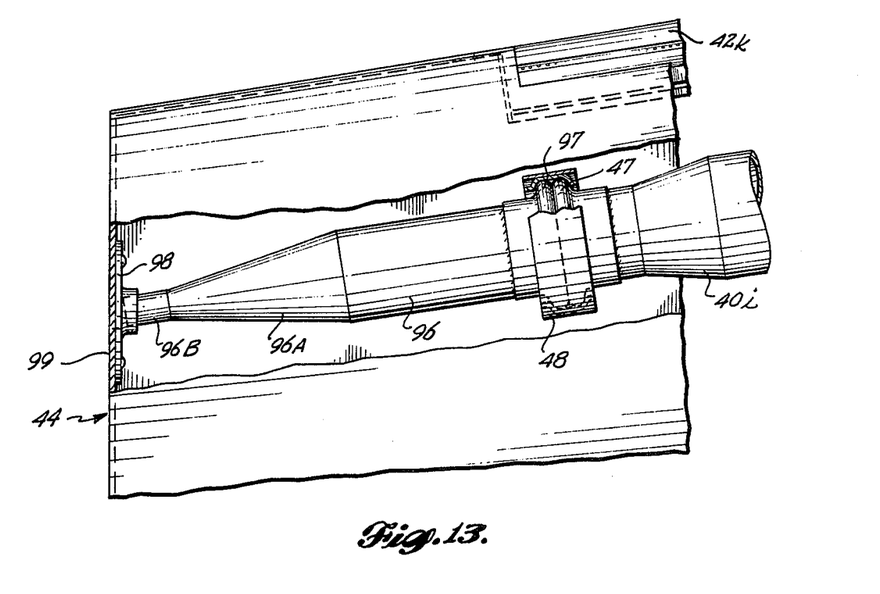
FIG. 13 is a top plan view of the wing tip including a partial cutaway portion illustrating an outboard termination of the manifold used for injector de-icing.

Under adverse operating conditions where a substantial number of the apertures 87 forming the plurality of injectors 29 are blocked by ice, the BLC system would be blocked from operation. Accordingly, the invention functions to de-ice the plurality of injectors 29 by the use of the venturi structure 44 illustrated in FIG. 13. A duct 96 has a circumferential lip 97 on a first or inboard end thereof which matches and which is joined to the corresponding lip 47 of the outboard end of the most outboard one of the manifolds $40_i$ by a Marmon clamp 97. The duct 96, at its outboard end, has a transition portion 96A whose diameter decreases to terminate in a substantially cylindrical conduit 96B which is received in and slidably supported by an apertured flange 98 secured to an outboard wing tip rib 99, with an aperture being provided in wing tip rib 99 in alignment with the aperture in the flange 98 and therefore with the interior of the conduit 96B. In normal operation, the transition portion 96A and conduit 96B function as a venturi so that the pressure drop thereacross limits the amount of BLC air fed therethrough. However, when BLC air cannot be fed through a substantial number of the plurality of injectors 29 due to ice, sustantial BLC air flows through duct 96, transition portion 96A, and conduit 96B, and therefore to the atmosphere, so that the plurality of manifolds $40_i$ may be heated to accordingly heat the interconnected nozzle plenums $42_k$ to de-ice the blocked injectors 29.

In a working prototype of the invention, the materials listed hereinafter in Table I were found to provide acceptable operaton of the BLC system within the temperature and pressure ranges previously described while yet facilitating the manufacture and assembly of the system.

TABLE I

| Element | Material |
|---|---|
| Supply duct 39 | 321 or 347 CRES steel |
| Manifolds $40_i$, $41_i$ | 321 or 347 CRES steel |
| Plenums $42_k$, $43_k$ | 321 or 347 CRES steel |
| Lips 46, 47 | Inconel steel |
| Bellows 49 | 321 or 347 CRES steel |
| Lugs 50, 51 | 321 or 347 CRES steel |
| Feeder Ducts 52 | 321 or 347 CRES steel |
| Feeder Ducts 53 | Inconel steel |
| Tie Straps 54 | 321 or 347 CRES steel |
| Lugs 54A | 321 or 347 CRES steel |
| Sealing Plates 55 | 321 or 347 CRES steel |
| Bushings 56, 57 | 17-4 PH, passivated steel |
| Bolts and Nuts 58 | A286 steel |
| Nose Beam 60 | 2024 aluminum |
| Support ribs 61 | 7075 aluminum |
| Air support ribs 62, 63 | 2024 aluminum |
| Support channels 64, 64A, 65, 65A | 2024 aluminum |
| Nose panels 66, 67 | Fiberglass Honeycomb |
| Tie straps 68 | 2024 aluminum |
| Spacers 83, 85 | Titanium |
| Plates, 84, 86 | Titanium |
| Plates 90, 91 | 321 or 347 CRES steel |
| Plenum seals 92 | Fiberglass reinforced silicon rubber |
| Seal retainers 93, 94 | 2024 aluminum |
| Duct 96 | 321 or 347 CRES steel |
| Lip 97 | Inconel steel |
| Flange 98 | 321 or 347 CRES steel |
| Wing tip rib 99 | 2024 aluminum |

While the invention has been described with respect to a preferred embodiment, it is to be clearly understood by those skilled in the art that the invention is not limited thereto, but rather is intended to be interpreted only in accordance with the appended claims. For example, the specific number $i$ of the manifolds $40_i$, $41_i$ is chosen preferably in view of the ease of manufacture of the manifolds $40_i$, $41_i$ and in view of the expansion that can be accommodated in the bellows 49. Theoretically, a single manifold could be used but such a manifold would experience, in the examples discussed, an expansion of approximately 4 inches at its outboard end. Likewise, two nozzle plenums $42_k$, $43_k$ are associated with each manifold $40_i$, $41_i$ primarily to allow fabrication of such nozzle plenums in straight line segments which, in assembly, approximate the spanwise curved leading edges of the wings 23, 25.

What is claimed is:

1. An improved boundary layer control system for aircraft for injecting controlled air, whose temperature and pressure are substantially greater than ambient temperature and pressure and which is obtained from a controllable air source, into a boundary layer region adjacent to an airfoil surface of the aircraft from a plurality of points located spanwise along at least a portion of a surface of a member of the aircraft forward of the airfoil surface, said system comprising:

(a) means defining a slot in the forward surface, said slot extending spanwise along the forward surface substantially coextensive with said portion of the forward surface from which controlled air is to be injected;

(b) a plurality of longitudinally-extending manifolds for conducting air from the controllable source thereof to points along the forward surface, each said manifold having an open inboard end and an open outboard end;

(c) means mounting said plurality of manifolds in successive spanwise arrangement within the aircraft member, said mounting means including a plurality of first supports, each of said first supports securing, in a fixed position, one of said plurality of said manifolds to the aircraft member in proximity to a respective inboard end of said one manifold, and a plurality of second supports, each of said second supports securing one of said plurality of manifolds to the aircraft member in proximity to a respective outboard end of said one manifold so that each said one manifold can expand longitudinally and thus in a spanwise direction along the aircraft member;

(d) first means interconnecting said inboard end of the most inboard one of said plurality of manifolds with the controllable air source;

(e) a plurality of second means interconnecting the inboard end of each successive outboard one of said plurality of manifolds with the outboard end of an adjacent inboard one of said plurality of manifolds, each said second means being capable of compression upon longitudinal expansion of said manifolds;

(f) a plurality of longitudinally-extending nozzle plenums, at least one said nozzle plenum being associated with a corresponding one of said plurality of manifolds, each said nozzle plenum having a closed inboard end and a closed outboard end, and further having a front wall member configured to fit into said slot and having located therealong a plurality of apertures arranged to inject air into the boundary layer region, each said nozzle plenum also having an upper tongue and a lower tongue both extending longitudinally therealong from said inboard end to said outboard end;

(g) a plurality of third means interconnecting each nozzle plenum with and supporting each nozzle plenum from a corresponding one of said plurality of manifolds so that said plurality of nozzle plenums are located within the aircraft member and in successive spanwise arrangement therealong, each said third means including first and second feeder ducts respectively located in proximity to said inboard and said outboard ends of each said nozzle plenum, said first and said second feeder ducts being capable of permitting relative longitudinal movement between said nozzle plenum and said corresponding one of said plurality of manifolds, each said third means further including a third feeder duct located intermediate said first and said second feeder ducts;

(h) means within the aircraft member defining upper and lower, longitudinal grooves respectively extending above and below and both adjacent to said slot and receiving said upper and lower tongues of said plurality of said nozzle plenums for permitting said nozzle plenums to move longitudinally relative to the aircraft member and for maintaining said front wall member of each said nozzle plenum substantially flush with the forward surface, the outboard end of each said nozzle plenum being adjacent to and separated from the inboard end of an adjacent, outboard one of said nozzle plenums in assembly; and (i) a plurality of sealing means for substantially blocking airflow through said slot between adjacent nozzle plenums, each said sealing means comprising: an upper plate and a lower plate secured to said front wall member at the outboard end of each said nozzle plenum and respectively above and below said apertures therein, said upper and lower plates extending over the inboard end of the front wall member of the adjacent, outboard one of the nozzle plenums and being configured to permit airflow from the plurality of apertures in said adjacent, outboard one of said nozzle plenums upon relative longitudinal movement of said adjacent nozzle plenums; and, flexible means located within said aircraft member and having a longitudinal dimension sufficient to cover the outboard and inboard ends of adjacent nozzle plenums and the separation therebetween, said flexible means being secured to the aircraft member at points in proximity to said outboard and inboard ends of adjacent nozzle plenums.

* * * * *

UNITED STATES PATENT AND TRADEMARK OFFICE
CERTIFICATE OF CORRECTION

PATENT NO. : 4,099,691
DATED : July 11, 1978
INVENTOR(S) : Everts W. Swanson et al.

It is certified that error appears in the above-identified patent and that said Letters Patent are hereby corrected as shown below:

In the Abstract, line 11: "penums" is changed to —plenums—.

Column 1, line 48: "fabricted" is changed to —fabricated—.

Column 3, line 45: "FI. 5" is changed to —FIG. 5—.

Column 5, line 24: "firstone" is changed to —first one—.

Column 7, lines 61-62: "channels" is changed to —channel—.

Column 7, line 66: "throgh" is changed to —through—.

Column 9, line 38: "inboards" is changed to —inboard—.

Column 9, line 50: "spacers 84 and plate 84" is changed to —spacers 85 and plate 86—.

Signed and Sealed this

Sixth Day of February 1979

[SEAL]

Attest:

RUTH C. MASON
Attesting Officer

DONALD W. BANNER
Commissioner of Patents and Trademarks